United States Patent [19]

St. Onge

[11] Patent Number: 5,718,443
[45] Date of Patent: Feb. 17, 1998

[54] LONGITUDINALLY AND VERTICALLY ADJUSTABLE AXLE ASSEMBLY

[76] Inventor: Daniel R. St. Onge, 13501 Parkwood La., Burnsville, Minn. 55337

[21] Appl. No.: 571,295

[22] Filed: Dec. 12, 1995

[51] Int. Cl.⁶ .................................................. B62D 61/12
[52] U.S. Cl. ........................ 280/405.1; 280/407.1; 280/149.2; 180/24.02
[58] Field of Search ................. 280/405.1, 407.1, 280/149.2, 704, 81.6, 43.2, 43.23; 180/24.02, 906

[56] References Cited

U.S. PATENT DOCUMENTS

| | | | |
|---|---|---|---|
| 2,577,691 | 12/1951 | Shrader et al. | 177/136 |
| 3,112,100 | 11/1963 | Prichard | 280/407.1 |
| 3,161,418 | 12/1964 | Brennan et al. | 280/405.1 |
| 3,191,963 | 6/1965 | Prichard | 180/24.02 |
| 3,209,850 | 10/1965 | Fish | 280/149.2 |
| 3,240,477 | 3/1966 | Brennan et al. | 280/405.1 |
| 3,896,947 | 7/1975 | Pearce | 214/82 |
| 4,195,856 | 4/1980 | Larson et al. | 280/81.1 |
| 4,204,697 | 5/1980 | Santerre | 180/24.02 X |
| 4,421,331 | 12/1983 | Ferris | 280/81.1 |
| 4,588,201 | 5/1986 | Mohrbacker | 280/450.1 |
| 4,631,919 | 12/1986 | Brennan | 60/413 |
| 4,684,142 | 8/1987 | Christenson . | |
| 4,705,133 | 11/1987 | Christenson et al. | 280/704 X |
| 4,762,421 | 8/1988 | Christenson et al. | 280/405.1 |
| 4,812,044 | 3/1989 | Christenson . | |
| 4,848,783 | 7/1989 | Christenson et al. | 280/405.1 |
| 5,018,755 | 5/1991 | McNeilus et al. . | |
| 5,090,495 | 2/1992 | Christenson . | |
| 5,230,392 | 7/1993 | Tremblay | 177/137 |
| 5,370,196 | 12/1994 | Bishop | 180/24.02 |
| 5,410,109 | 4/1995 | Tarter et al. | 177/136 |
| 5,458,355 | 10/1995 | Young | 280/405.1 |
| 5,498,021 | 3/1996 | Christenson . | |
| 5,516,135 | 5/1996 | Christenson . | |
| 5,597,174 | 1/1997 | Christenson et al. . | |

FOREIGN PATENT DOCUMENTS

| | | | |
|---|---|---|---|
| 0923933 | 4/1973 | Canada | 280/149.2 |
| 3005976 | 4/1993 | WIPO | 280/405.1 |

OTHER PUBLICATIONS

Strong Arm your Truck For the Largest Legal Payload brochure, Strong Industries, Inc., 13617 Ralph Culver, Houston, Texas, 77086, 713–847–9304.
Vol. 13, No. 1, Jan./Feb. 1995 issue of Truck Sales & Leasing, 'B' Is For Bridge Formula, pp. 44–47.
Summer, 1995, Clement Update, Clement Industries, P.O. Box 914, Minden, LA 71058–0914, 318–377–2776.

*Primary Examiner*—Christopher P. Ellis
*Attorney, Agent, or Firm*—Peterson, Wicks, Nemer & Kamrath, P.A.

[57] ABSTRACT

An axle assembly (10) is disclosed including a carrier (24) having side edges extending intermediate the frame rails (14) of a truck 12 and supports (28) secured to the frame rails (14). The carrier (24) is moved relative to the frame rails (14) by a screw (32) rotated about an axis by a hydraulic motor (36) to move a collar (40) threaded thereon and secured to the carrier (24). The carrier (24) is selectively locked in position relative to the frame rails (14) by simultaneously sliding first and second pins (44) slideably mounted to the carrier (24) into seats (58) fixed to the frame rails (14). The first ends of a pair of arms (66) are secured to an axle (60) having steerable wheels (62) while the opposite ends are pivotally mounted to the carrier (24). The arms (66) are pivoted relative to the carrier (24) by an actuator (70) to move the wheels (62) between ground-engaging and elevated positions. First and second arcuate brackets (84) are secured to the opposite ends of a rotatable shaft (80) and carry pedestals (86). A hydraulic cylinder (88) rotates the shaft (80) to place the pedestals (86) in a horizontal, transport position and a vertical, lock-out position with the lower ends of the pedestals (86) abutting with the axle (60) and their upper ends vertically in line with and for abutment with stop pads (94) secured to the supports (28).

33 Claims, 3 Drawing Sheets

LONGITUDINALLY AND VERTICALLY ADJUSTABLE AXLE ASSEMBLY

BACKGROUND

The present invention relates generally to auxiliary axle assemblies for work-type vehicles, particularly to auxiliary axle assemblies which can be vertically adjusted between an elevated, non-ground-engaging condition and various ground-engaging conditions, and specifically to auxiliary axle assemblies which can be longitudinally and vertically adjusted relative to the work-type vehicle.

To prevent undue deterioration of highways and other road surfaces, weight restrictions are imposed on vehicles traveling over those highways and road surfaces. Most commonly, the weight restrictions are measured in terms of load per axle and the overall spacing between axles. It is readily apparent that if the number of axles of the truck and the spacing thereof can be increased, a given vehicle may carry a higher payload than would otherwise be permitted. Included in the prior art are numerous devices designed to achieve the foregoing end. For example, U.S. Pat. No. 4,848,783 represents a major advance in the art of retractable axle assemblies; however, the disclosed retractable axle assembly suffers from many shortcomings. Specifically, the retractable axle assembly can only be used with certain types of payloads such as a cement or concrete mixer shown and specifically including voids for receipt of the axle assembly in its elevated disposition and particularly is not usable on other types of payloads such as dump trucks. Further, the axle assembly in its ground-engaging disposition represents the rear-most point of the vehicle and limits the extent to which the vehicle can be backed up to an obstruction. To attempt to move the axle assembly within the extent of the payload requires the wheels to be in an elevated disposition such that the auxiliary axle no longer provides support to the vehicle. Other prior retractable axle assemblies suffered from the same and similar shortcomings. As an example, while some retractable axle assemblies can be utilized on other types of payloads such as dump trucks, such assemblies were often mounted to the dump box itself placing stress upon the dump box resulting in reduced life expectancy or requiring structural modification. Further, such assemblies could not be in a ground-engaging disposition when the dump box was tilted to discharge the payload from the dump box.

Thus, a need continues to exist for auxiliary axle assemblies for work-type vehicles which overcome the various shortcomings of prior axle assemblies and which are otherwise advantageous thereover.

SUMMARY

The present invention solves this need and other problems in the field of auxiliary axle assemblies for vehicles by providing, in the preferred form, provisions for moving a carrier movably mounted to the frame rails of a vehicle for movement in a longitudinal direction between a retracted position and an extended position with an axle including at least a pair of wheels adjustably mounted to the carrier for vertical movement of the wheels between a surface engaging position and an elevated position spaced above the surface.

In further aspects of the present invention, a device is disclosed for providing a removable rigid connection between an axle and frame rails to which the axle is pivotally mounted and including a movable pedestal located intermediate the axle and a stop pad secured to the frame rail with its lower end abutting with the axle in a lock-out position and being in a non-engaging condition with the axle and the stop pad in a transport position.

In other aspects of the present invention, a carrier is selectively locked in position relative to frame rails to prevent unintentional movement of the carrier relative to the frame rails by first and second pins slideably mounted to the carrier along spaced, parallel, slide axes and moved by a lever pivotally mounted to the carrier with first and second links pivotally connected to the opposite ends of the lever and pivotally connected to first and second pins.

In still other aspects of the present invention, a carrier is moved relative to frame rails between retracted and extended positions by a collar secured to the carrier and threadably received on a rotatable screw such that rotation of the screw results in longitudinal movement of the collar on the screw.

It is thus an object of the present invention to provide a novel auxiliary axle assembly for a vehicle.

It is further an object of the present invention to provide such a novel axle assembly which is longitudinally and vertically adjustable.

It is further an object of the present invention to provide such a novel axle assembly which is mounted to the vehicle frame independent of the payload.

It is further an object of the present invention to provide such a novel axle assembly providing support to the vehicle in its longitudinally retracted position.

It is further an object of the present invention to provide such a novel axle assembly usable in generally all types of payloads.

It is further an object of the present invention to provide such a novel axle assembly usable with dump boxes.

It is further an object of the present invention to provide such a novel axle assembly providing support to the vehicle while allowing the vehicle to back up to obstructions.

It is further an object of the present invention to provide such a novel axle assembly not compromising the turning radius of the vehicle.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 3 shows a partial, bottom plan view of the dump truck and the longitudinally and vertically adjustable axle assembly of FIG. 1 according to view line 3—3 of FIG. 2.

Figure 1:
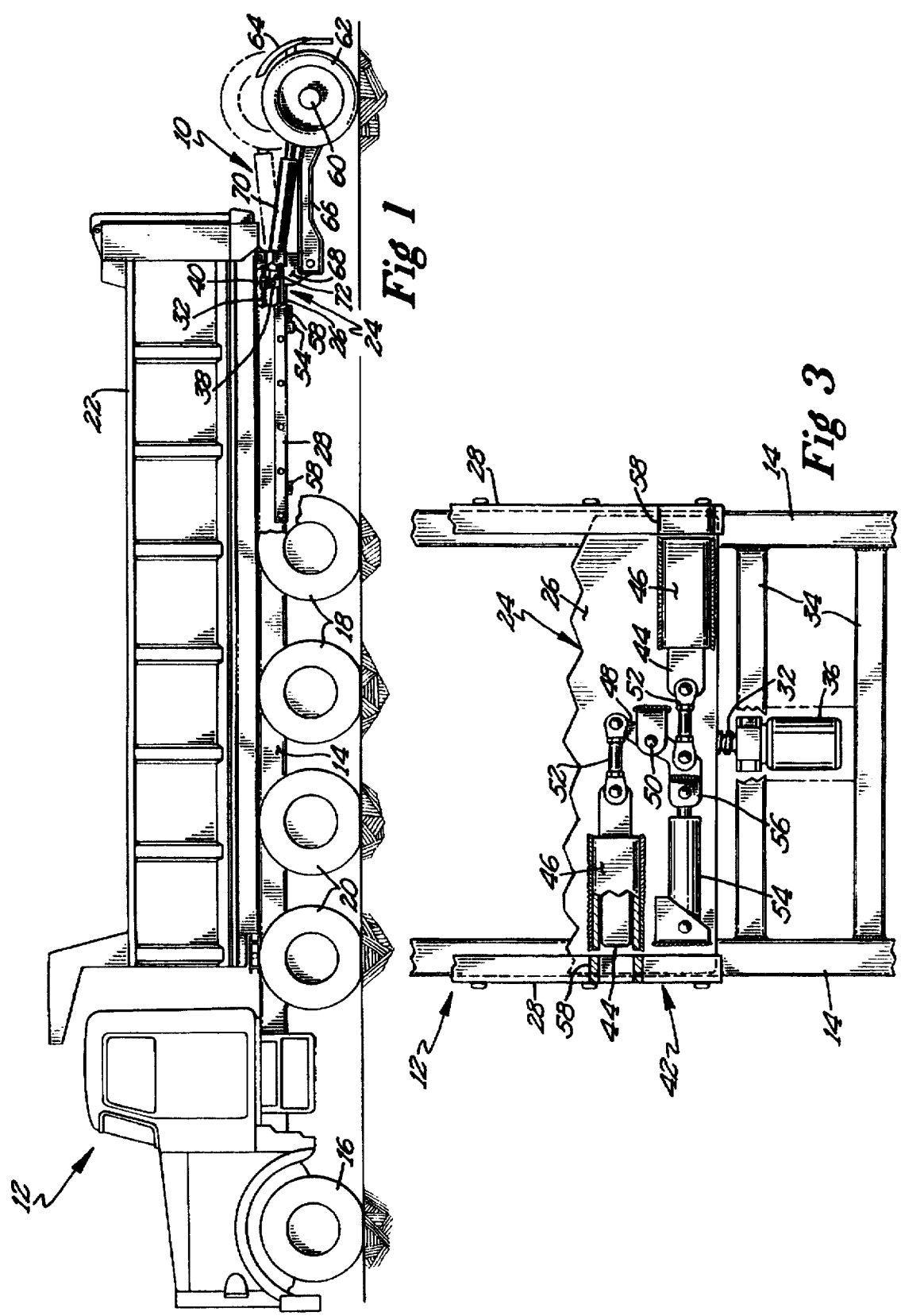
FIG. 1 shows a side elevational view of a dump truck including a longitudinally and vertically adjustable axle assembly according to the preferred teachings of the present invention in its extended, ground-engaging position, with the elevated position being shown in phantom.

All figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "front", "back", "upper", "lower", "height", "width", "length", "end", "side", "horizontal", "vertical", "axial", "radial", "longitudinal", "lateral", and similar terms are used herein, it should be understood that these terms have reference only to the structure shown in the drawings as it would appear to a person viewing the drawings and are utilized only to facilitate describing the illustrative embodiment.

DESCRIPTION

A longitudinally and vertically adjustable axle assembly according to the preferred teachings of the present invention is shown in the drawings and generally designated 10. Assembly 10 is utilized in conjunction with a work-type vehicle such as a truck 12 of a conventional design. Generally truck 12 includes longitudinally extending frame rails 14. Frame rails 14 are movably supported by a plurality of axle assemblies including a pair of steerable front wheels 16, at least one pair of drive wheels 18, with two pair being shown in the preferred form, and optionally pair(s) of auxiliary pusher wheels 20 which may be retractable, with two pair being shown. Truck 12 is adapted to travel over a highway or similar surface and movably supports a suitable payload, with a tiltable dump box 22 being shown However, it can be appreciated that the payload can take other forms including but not limited to a garbage compactor, a delivery van, a liquid tanker, a cement or concrete mixer, flatbed, and the like.

Assembly 10 according to the preferred teachings of the present invention generally includes a carrier 24 which is movably mounted in a longitudinal direction parallel to frame rails 14 and in the most preferred form between a retracted position adjacent the rear pair of drive wheels 18 and an extended position longitudinally spaced rearward of the rear pair of drive wheels 18 and adjacent the rear ends of frame rails 14. In the preferred form, carrier 24 generally includes a slide plate 26 having parallel side edges spaced generally equal to the spacing between frame rails 14.

In the preferred form, carrier 24 is slideably mounted to frame rails 14 by first and second, longitudinally extending, L-shaped supports 28 having vertical legs suitably secured to the outside surface of rails 14 such as by bolting and horizontal legs spaced below and parallel to the lower surfaces of rails 14. The horizontal legs extend inwardly of the vertical legs. The side edges of slide plate 26 are located between the horizontal legs of supports 28 and the lower surfaces of rails 14 to mount carrier 24 to and for movement relative to rails 14. To reduce friction and wear, suitable slide blocks 30 are positioned between the lower surfaces of rails 14 and the upper surface of slide plate 26 and between the lower surface of slide plate 26 and the upper surfaces of the horizontal legs of supports 28, with blocks 30 being secured to rails 14 and supports 28 in the most preferred form.

While slideably mounted between rails 14 and supports 28, carrier 24 is moved between the retracted position and the extended position in the preferred form by an elongated drive screw 32 rotatably mounted about a longitudinal axis parallel to and intermediate frame rails 14 such as between first and second cross braces 34 extending between frame rails 14. Screw 32 can be rotated by any conventional manner such as by a hydraulic motor 36 fixed to the longitudinal forward end of screw 32. An upright 38 is suitably secured to the upper surface of slide plate 26 and includes a threaded collar 40. Screw 32 is threadably received within collar 40 and collar 40 is positioned on screw 32 intermediate cross braces 34. Thus, it can be appreciated that when screw 32 is rotated such as by motor 36, collar 40 and carrier 24 will move longitudinally along screw 32, with the direction of movement being dependent upon the direction of rotation of screw 32. It should be appreciated that screw 32 can be positioned within a first accordion-type boot, not shown, extending between first cross brace 34 and collar 40 and a second accordion-type boot, not shown, extending between second cross brace 34 and collar 40 to protect screw 32 from the elements and to prevent grease of screw 32 from splashing onto adjacent components.

Assembly 10 according to the preferred teachings of the present invention further includes a device 42 for selectively locking carrier 24 in position to prevent unintentional movement thereof relative to frame rails 14. In the preferred form, device 42 generally includes first and second locking pins 44 slideably mounted along spaced, parallel, lateral slide axes. In the most preferred form, pins 44 are slideably mounted by channels 46 secured to the lower surface of slide plate 26 intermediate frame rails 14. Pins 44 are simultaneously slid between extended, locked positions and retracted, disengaged positions. In the preferred form, a lever 48 is suitably pivotally mounted to carrier 24 intermediate its ends about a vertical axis 50 extending perpendicular to the slide axes of pins 44. First and second links in the preferred form of turnbuckles 52 are provided having their first ends pivotally connected to the inner ends of first and second pins 44, respectively, and their second ends pivotally connected to the opposite ends of lever 48, with the axes of the pivotal connections of turnbuckles 52 being spaced from and parallel to axis 50. Suitable provisions are provided for pivoting lever 48 such as a hydraulic cylinder 54 having a first end pivotally connected to carrier 24 and a second end pivotally connected to ears 56 integrally secured to the first end of lever 48 opposite turnbuckle 52. Thus, when hydraulic cylinder 54 extends, first and second pins 44 simultaneously slide in opposite directions laterally outward in channels 46 from their disengaged positions to their locked positions. Similarly, when hydraulic cylinder 54 retracts, first and second pins 44 simultaneously slide laterally towards each other laterally inward in channels 46 from their locked positions to their disengaged positions. In the preferred form, supports 28 include a plurality of seats 58 for receiving pins 44 in their locked positions. It can then be appreciated that with pins 44 in their disengaged positions, carrier 24 is free to move such as by rotation of drive screw 32. However, when carrier 24 is positioned such that pins 44 can be moved from their disengaged positions to their locked positions and extended into seats 58, pins 44 extending into seats 58 prevent unintentional movement of carrier 24 relative to supports 28. First and second seats 58 are shown in the drawings corresponding to the retracted and extended positions of carrier 24. However, it can be appreciated that additional locations for seats 58 can be provided for locking carrier 24 in other desired positions intermediate the retracted and extended positions.

Assembly 10 according to the preferred teachings of the present invention further includes an axle 60 for a pair of self-steering wheels 62. Axle 60 can have any desired configuration such as shown, an I-beam, or the like. In the most preferred form, wheels 62 have a slight toe-in and include a conventional shock-absorbing-type tie rod connection. In the preferred form, fenders 64 are provided for wheels 62 which in the most preferred form are mounted to the tie rod connections so as to steer with wheels 62.

According to the preferred teachings of the present invention, assembly 10 further includes first and second, longitudinally extending, parallel arms 66. The first, rear ends of arms 66 are suitably secured to axle 60 by any suitable means. The second, forward ends of arms 66 are pivotally mounted to carrier 24 such as by first and second pairs of ears 68 extending vertically downward and generally perpendicular from the lower surface of slide plate 26. Arms 66 are pivoted relative to ears 68 and carrier 24 about a lateral axis by a hydraulic actuator 70. One end of actuator 70 is pivotally mounted to carrier 24 such as by first and second ears 72 extending vertically upward and generally perpendicular from the upper surface of slide plate 26. The other end of actuator 70 is pivotally mounted to arms 66 such as by first and second ears 74 extending vertically upward and generally perpendicular to a brace 76 extending between arms 66 located adjacent to the rear ends of arms 66 and to axle 60. Brace 76 can have any desired configuration such as tubular of rectangular or circular cross sections as shown. It can then be appreciated that extension of actuator 70 causes arms 66 to pivot relative to ears 68 with the rear ends of arms 66 and axle 60 moving vertically downward. On the other hand, retraction of actuator 70 causes arms 66 to pivot relative to ears 68 with the rear ends of arms 66 and axle 60 moving vertically upward. Thus, arms 66 and actuator 70 adjustably mount axle 60 to carrier 24 for vertical movement of wheels 62 between a surface-engaging position and an elevated position spaced above the surface.

In the most preferred form, assembly 10 according to the teachings of the present invention further includes a lock-out device 78 for stabilizing frame rails 14 when the payload is being discharged. Specifically, device 78 generally includes a shaft 80 pivotally mounted about a laterally extending axis to arms 66 adjacent to their rear ends and to axle 60 such as by ears 82 secured to arms 66.

First and second arcuate brackets 84 are secured on the opposite ends of shaft 80 and outside of arms 66. First and second pedestals 86 are secured to brackets 84. Shaft 80 is suitably rotated relative to arms 66 and in ears 82 such as by a hydraulic cylinder 88. One end of hydraulic cylinder 88 is pivotally mounted to arms 66 such as by ears 90 secured to ears 74. The other end of hydraulic cylinder 88 is pivotally mounted to axially spaced ears 92 extending radially from shaft 80. It can then be appreciated that extension of hydraulic cylinder 88 causes shaft 80, brackets 84, and pedestals 86 to pivot to a lock-out position with the lower ends of pedestals 86 abutting with the upper surface of axle 60 and extending generally vertically therefrom. On the other hand, retraction of hydraulic cylinder 88 causes shaft 80, brackets 84, and pedestals 86 to pivot to a transport position with pedestals 86 extending generally horizontal and with brackets 84 and pedestals 86 being in a non-engaging condition with axle 60. Device 78 further includes first and second stop pads 94 secured to supports 28 and thus to rails 14 generally vertically in line and above pedestals 86 in their lock-out position and when carrier 24 is located in its retracted position.

Figure 2:
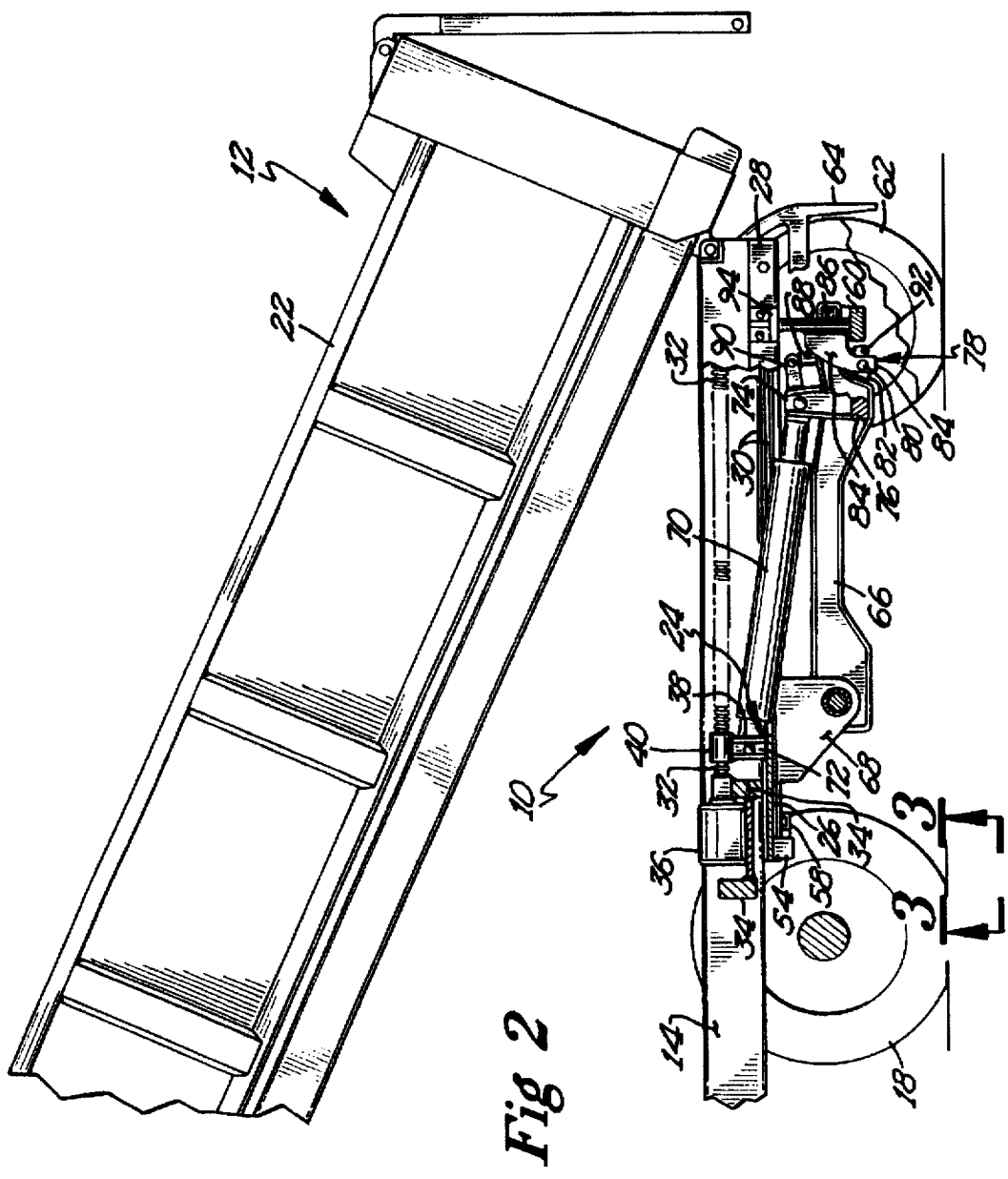
FIG. 2 shows a partial, side elevational view of the dump truck and the longitudinally and vertically adjustable axle assembly of FIG. 1 in its retracted, ground-engaging position.

Now that the basic construction of assembly 10 according to the preferred teachings of the present invention has been set forth, the operation of assembly 10 can be explained and advantages obtained by assembly 10 highlighted. For the sake of explanation, it will be assumed that carrier 24 is in its retracted position as shown in FIG. 2, device 42 is in its locked position, and actuator 70 is in its retracted condition such that arms 66 are pivoted relative to carrier 24 to raise wheels 62 off the ground. It would be desirable to have assembly 10 in this retracted, elevated position for a variety of reasons. For example, the payload may be light such as when dump box 22 is empty or only partially full where the extra support provided by assembly 10 is not required or desired. Similarly, if truck 12 is desired to be backed for long distances, wheels 62 can be elevated to prevent separation forces being placed thereon due to the toe-in arrangement of wheels 62. Likewise, wheels 62 can be off the ground so that the support provided by drive wheels 18 is maximized when truck 12 is located on rough terrain.

With carrier 24 in its retracted position, actuator 70 can be extended such that arms 66 are pivoted relative to carrier 24 to lower wheels 62 to engage the ground. It can then be appreciated that the amount of support provided to truck 12 by assembly 10 in relation to the amount of support provided by wheels 16, 18, and 20 can be adjusted by the amount that actuator 70 is extended, with the greater the amount of extension the greater the amount of support provided. It would be desirable to have assembly 10 in this retracted, ground-engaging position for a variety of reasons. For example, when the payload is such that the support provided by assembly 10 in its retracted position is within the weight restrictions of the highway and road surface, there is no need for the increased longitudinal spacing between wheels 16 and 62 possible with the present invention and thus increasing the ease of maneuverability and the like. Similarly, wheels 62 are within the longitudinal extent of dump box 22 to allow dumping the payload without obstruction by tilting box 22, as will be discussed further hereinafter, and to allow truck 12 to be backed up to obstructions such as loading docks, paving machines, and the like without wheels 62 being in the way but still allowing wheels 62 to provide support for truck 12.

In the event that the payload is such that the weight restrictions can not be met with wheels 62 in their retracted position and increased spacing between wheels 14 and 62 is required, device 42 is moved from its locked position to its disengaged position to thereby remove pins 44 from seats 58. With device 42 in its disengaged position, carrier 24 can be moved from its retracted position in the most preferred form by actuating hydraulic motor 36 to rotate drive screw 32. As carrier 24 moves from its retracted position towards its extended position, the longitudinal spacing between wheels 14 and 62 increases so that wheels 16, 18, 20, and 62 are within permissible weight restrictions. In the most preferred form, carrier 24 can be moved with wheels 62 in either the elevated or ground-engaging position. When carrier 24 is in the extended position, device 42 can be moved from its disengaged position to its locked position to extend pins 44 into seats 58. In this regard, carrier 24 can be placed in any desired longitudinal position spaced from its retracted position where seats 58 are provided. It would be desirable to have assembly 10 in the fully extended, ground engaging position as shown in FIG. 1 to allow truck 12 to haul the maximum payload while remaining within the road restrictions.

It should be noted that with carrier 24 in its extended position, it is possible to retract actuator 70 such that arms 66 are pivoted relative to carrier 24 to raise wheels 62 from the ground as shown in phantom in FIG. 1. It would be desirable to have assembly 10 in this extended, elevated position for a variety of reasons. For example, if truck 12 is desired to be backed for long distances, wheels 62 can be elevated to prevent separation forces being placed thereon due to the toe-in arrangement of wheels 62. Likewise, wheels 62 can be off the ground so that the support provided by drive wheels 18 is maximized when truck 12 is located on rough terrain.

It can then be appreciated that with device 42 in its locked position, carrier 24 is prevented from moving unintentionally relative to supports 28 and rails 14 due to the receipt of pins 44 in seats 58. For example, carrier 24 is prevented from sliding due to force transfer through arms 66 if wheels 62 should engage a large obstruction on the road surface while truck 12 is moving along the highway or road. Suitable lockouts or controls can be provided to allow operation of motor 36 only after pins 44 are disengaged from seats 58.

Figure 4:
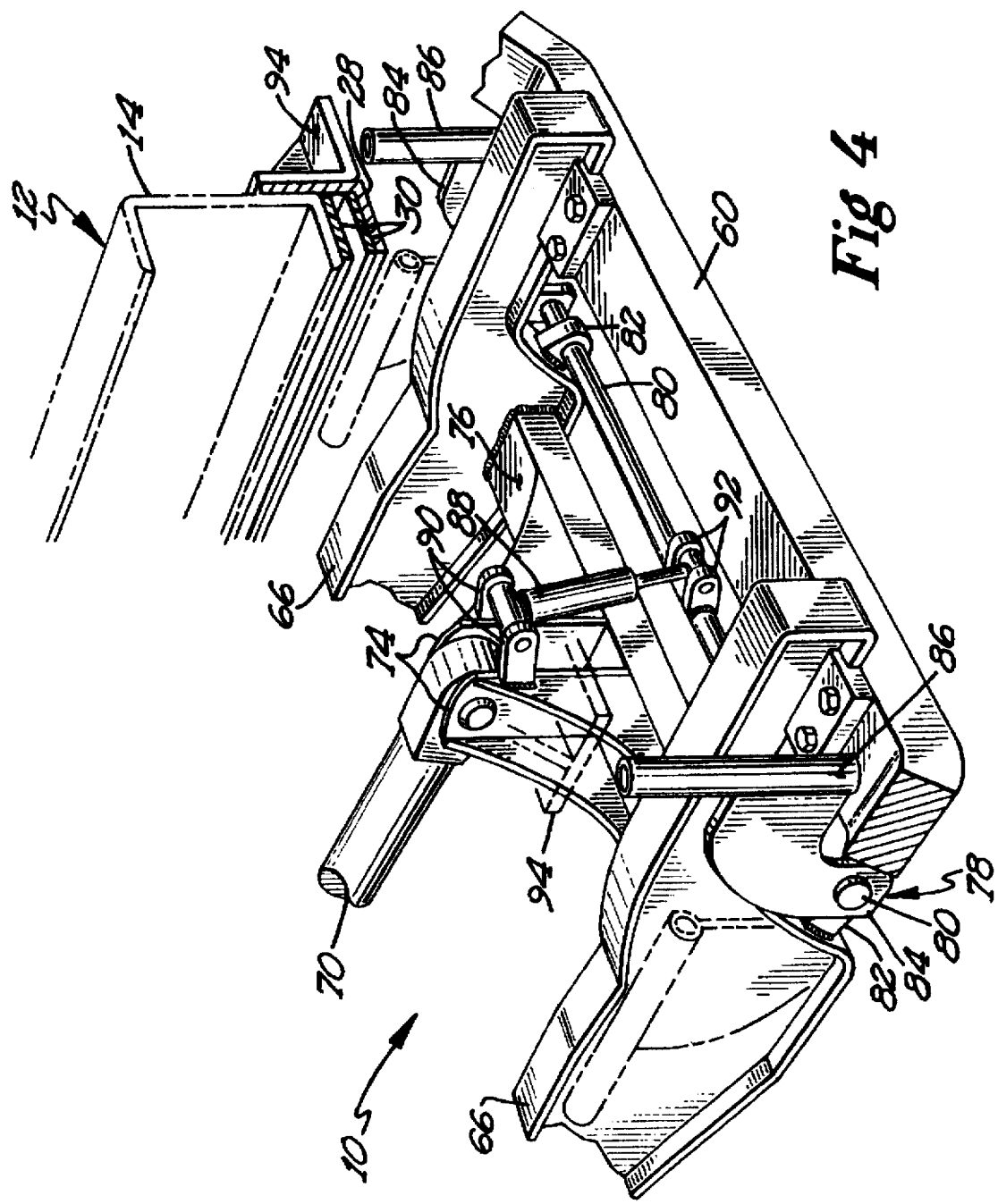
FIG. 4 shows a partial, rear perspective view of the dump truck and the longitudinally and vertically adjustable axle assembly of FIG. 1, with portions broken away and shown in phantom to show constructional details, with the transport position being shown in phantom.

In the most preferred form, actuator 70 is hydraulically energized and includes a nitrogen charged accumulator to provide a shock absorber effect between wheels 62 and carrier 24 while still allowing weight transfer. Thus, actuator 70 reduces the shock load to assembly 10 and truck 12 as the result of wheels 62 rolling over a rough surface such as rolling over railroad tracks crossing the highway or road upon which truck 12 is traveling. However, it can be appreciated that in the preferred form shown where the payload is a dump box 22, as box 22 is tilted in a manner as shown in FIG. 2, the weight of the payload is shifted towards the rear of truck 12 and in particular more weight is transferred to assembly 10. Such a dramatic increase in weight transfer can result in the compression of the nitrogen charge and the undesired retraction of actuator 70. According to the teachings of the present invention and with assembly 10 in its retracted, ground-engaging position, device 78 is pivoted from its transport position to its lock-out position as shown in FIG. 4 prior to box 22 being tilted. At that time, the suspension of wheels 18 and 20 can be lowered such as by releasing air from an air suspension system such that frame rails 14 and supports 28 move closer to the ground and such that stop pads 94 engage and are supported upon the upper ends of pedestals 86. It can then be appreciated that with pedestals 86 sandwiched between axle 60 and stop pads 94, all force transfer between frame rails 14 and axle 60 is through pedestals 86 and not through actuator 70. Thus, a removable rigid connection is provided by lock-out device 78 between axle 60 and rails 14 to very stably hold box 22 while it is being tilted. After the payload has been discharged and dump box 22 is tilted back to its horizontal position and with stop pads 94 spaced from the upper ends of pedestals 86, lock-out device 78 can be moved from its lock-out position to its transport position as shown in phantom in FIG. 4. Suitable lock outs or controls can be provided to allow tilting of dump box 22 only after carrier 24 is in its retracted position and device 78 is in its lock-out position.

It should then be appreciated that assembly 10 according to the preferred teachings of the present invention is especially advantageous when utilized with a payload in the form of dump box 22. In particular, assembly 10 can be positioned within the longitudinal extent of and below dump box 22 and particularly is out of the way so that material exiting the tailgate does not engage with assembly 10. Thus, truck 12 can spread material as it is being dumped from box 22. Additionally, truck 12 can back up to and unload into paving machines. In summary, truck 12 according to the teachings of the present invention can operate the same as a conventional dump truck but is able to haul approximately 30 to 40% more payload while keeping within the same weight restrictions. In addition, assembly 10, especially with the provisions of lock-out device 78, provides support to truck 12 while dump box 22 is being tilted whereas prior auxiliary axles were required to be in an elevated position. This is especially important because the location of the pivot of dump box 22 is at a much greater longitudinal spacing from drive wheels 18 and can create a very unstable condition. Further, prior auxiliary tag axles for dump trucks were raised above the floor of the dump box at the rear of the dump box making the tilting box very top heavy and further decreasing stability. However, wheels 62 are in a ground-engaging position and are located below dump box 22 and longitudinally adjacent the pivot of dump box 22 in assembly 10 of the present invention to stabilize dump box 22 and allow discharge by tilting even on uneven terrain. Further, assembly 10 according to the preferred teachings of the present invention is entirely mounted to frame rails 14 and specifically is completely independent of and not mounted to or require modification of dump box 22. Thus, weight transfer to frame rails 14 by assembly 10 according to the teachings of the present invention does not occur through dump box 22 and therefore does not place increased stress thereon. It can also be appreciated that assembly 10 can be mounted to frame rails 14 prior to mounting of dump box 22 (or other type of payload which need not be known at the time of mounting of assembly 10), and no modifications or other installment steps are required for assembly 10 after dump box 22 is mounted.

In the preferred form, fenders 64 can include tail and similar lights necessary for truck 12. In the most preferred form, fenders 64 are formed of plastic and are deformable so that another vehicle engaging truck 12 including assembly 10 according to the teachings of the present invention will generally engage the outer periphery of wheels 62, with assembly 10 thus meeting current bumper protection guidelines of the Interstate Commerce Commission in the United States of America.

Assembly 10 according to the preferred teachings of the present invention allows the wheel base between wheels 16 and 18 to be maintained such that the turning radius and maneuverability of truck 12 is not compromised while truck 12 can haul the same payload as a tractor trailer combination but taking up less space on the road and job sites. This feature is especially important in allowing a relatively large load to be transported in locations having relatively tight quarters where tractor trailer combinations have difficulty maneuvering including city streets and alleys, cul-de-sacs, and the like.

Now that the basic teachings of the present invention have been explained, many extensions and variations will be obvious to one having ordinary skill in the art. For example, in the preferred form, assembly 10 according to the preferred teachings of the present invention incorporates several unique features believed to produce synergistic results. However, it can be appreciated that such features can be utilized separately or in a variety of other combinations according to the teachings of the present invention.

Likewise, although assembly 10 in the most preferred form provides the rear-most support of frame rails 14 of truck 12, it can be appreciated that assembly 10 or unique features thereof can be utilized in other locations along frame rails 14 according to the teachings of the present invention.

Further, although carrier 24 is moved in the most preferred form by rotatable drive screw 32 and is believed to be advantageous, carrier 24 can be moved in other manners according to the teachings of the present invention including but not limited to by hydraulic winch, double acting hydraulic cylinder, and rack and pinion drives.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

I claim:

1. Axle assembly for a vehicle adapted to travel over a surface and having longitudinally extending frame rails having a longitudinal extent, comprising, in combination: a carrier; means for movably mounting the carrier to the frame rails of the vehicle for movement in a longitudinal direction between a retracted position and an extended position; means for moving the carrier in the movably mounting means between the retracted and extended positions; an axle including at least a pair of wheels; at least a first arm having a first end and a second end, with the axle secured to the first end of the arm and the second end of the arm being pivotally mounted to the carrier about a lateral axis; and means for pivoting the arm relative to the carrier for adjustably moving the axle relative to the carrier for vertical movement of the wheels between a surface engaging position and an elevated position spaced above the surface, with the pivoting means having a first end pivotally mounted to the carrier and a second end pivotally mounted to the arm, with the axle assembly being positioned generally within the longitudinal extent of the frame rails when the carrier is in the retracted position, with the carrier movable between the retracted and extended positions with the wheels in either the surface engaging position or the elevated position.

2. The axle assembly of claim 1 wherein the pivoting means comprises an actuator providing a shock absorber effect between the wheels and the carrier; and wherein the axle assembly further comprises, in combination: means for providing a removable rigid connection between the axle and the frame rails comprising, in combination: at least a first pedestal having lower and upper ends; and means for moving the pedestal between a transport position and a lock-out position, with the pedestal positioned between the axle and the frame rails in the lock-out position for sandwiching between the axle and the frame rails, with the pedestal being in a non-engaging condition with at least one of the axle and the stop pad in the transport position allowing vertical movement of the axle relative to the frame rails.

3. The axle assembly of claim 2 wherein the pedestal moving means comprises, in combination: a shaft rotatable about an axis; an arcuate bracket secured to the shaft for rotation with the shaft about the axis, with the pedestal secured to the bracket; and means for rotating the shaft about the axis.

4. The axle assembly of claim 1 further comprising, in combination: means for selectively locking the carrier in position relative to the frame rails to prevent unintentional movement of the carrier relative to the frame rails comprising, in combination: at least a first pin slideably mounted to one of the carrier and the frame rails between a locked position and a disengaged position; means for moving the pin between the locked and disengaged positions; and a seat mounted to the other of the carrier and the frame rails for receiving the pin in the locked position.

5. The axle assembly of claim 4 wherein the selectively locking means further comprises, in combination: a second pin, with the first and second pins being slideably mounted to the carrier along spaced, parallel, slide axes; and wherein the pin moving means comprises, in combination: a lever having first and second ends, with the lever being pivotally mounted to the carrier about a pivot axis extending perpendicular to the slide axes of the pins; first and second links each having first and second ends, with the first end of the first link being pivotally connected to the first end of the lever and the first end of the second link being pivotally connected to the second end of the lever, with the second end of the first link being pivotally connected to the first pin and the second end of the second link being pivotally connected to the second pin; and means for pivoting the lever about the pivot axis.

6. The axle assembly of claim 5 wherein the movably mounting means comprises, in combination: first and second, longitudinally extending L-shaped supports each having vertical legs and horizontal legs, with the vertical legs being adapted to be secured to the frame rails with the horizontal legs extending inwardly of the vertical legs and positioned spaced from and parallel to the frame rails, with the carrier having side edges adapted to extend between the horizontal legs of the supports and the frame rails, with the seats being formed on the L-shaped supports.

7. The axle assembly of claim 4 wherein the adjustably mounting means comprises, in combination: at least a first arm having a first end and a second end, with the axle secured to the first end of the arm and the second end of the arm being pivotally mounted to the carrier; and means for pivoting the arm relative to the carrier.

8. The axle assembly of claim 1 wherein the carrier moving means comprises, in combination: a screw rotatably mounted about a longitudinal axis; a threaded collar threadably received on the screw for longitudinal movement on the screw with rotation of the screw, with the collar being fixed to the carrier; and means for rotating the screw.

9. The axle assembly of claim 8 wherein the movably mounting means comprises, in combination: first and second, longitudinally extending L-shaped supports each having vertical legs and horizontal legs, with the vertical legs being adapted to be secured to the frame rails with the horizontal legs extending inwardly of the vertical legs and positioned spaced from and parallel to the frame rails, with the carrier having side edges adapted to extend between the horizontal legs of the supports and the frame rails.

10. The axle assembly of claim 8 wherein the adjustably mounting means comprises, in combination: at least a first arm having a first end and a second end, with the axle secured to the first end of the arm and the second end of the arm being pivotally mounted to the carrier; and means for pivoting the arm relative to the carrier.

11. The axle assembly of claim 1 wherein the movably mounting means comprises, in combination: first and second, longitudinally extending L-shaped supports each having vertical legs and horizontal legs, with the vertical legs being adapted to be secured to the frame rails with the horizontal legs extending inwardly of the vertical legs and positioned spaced from and parallel to the frame rails, with the carrier having side edges adapted to extend between the horizontal legs of the supports and the frame rails.

12. Axle assembly for a vehicle adapted to travel over a surface and having longitudinally extending frame rails, comprising, in combination: a carrier mounted to the frame rails; an axle including at least a pair of wheels; at least a first arm having a first end and a second end, with the axle secured to the first end of the arm and the second end of the arm being pivotally mounted to the carrier; means for pivoting the arm relative to the carrier for vertical movement of the wheels between a surface engaging position and an elevated position spaced above the surface and for providing a shock absorber effect between the wheels and the carrier; and means for providing a removable rigid connection between the axle and the frame rails comprising, in combination: at least a first pedestal having lower and upper ends; a stop pad adapted to be secured to the frame rail; and means for moving the pedestal between a transport position and a lock-out position, with the pedestal located intermediate the axle and the stop pad and the lower end of the pedestal abutting with the axle in the lock-out position, with the pedestal being in a non-engaging condition with the axle and the stop pad in the transport position.

13. The axle assembly of claim 12 wherein the pedestal moving means comprises, in combination: a shaft rotatable about an axis; an arcuate bracket secured to the shaft for rotation with the shaft about the axis, with the pedestal secured to the bracket; and means for rotating the shaft about the axis.

14. The axle assembly of claim 13 further comprising, in combination: means for movably mounting the carrier to the frame rails of the vehicle for movement in a longitudinal direction between a retracted position and an extended position.

15. Axle assembly for a vehicle adapted to travel over a surface and having longitudinally extending frame rails, comprising, in combination: a carrier; means for movably mounting the carrier to the frame rails of the vehicle for movement in a longitudinal direction between a retracted position and an extended position; an axle including at least a pair of wheels; means for mounting the axle to the carrier; and means for selectively locking the carrier in position relative to the frame rails to prevent unintentional movement of the carrier relative to the frame rails comprising, in combination: first and second pins slideably mounted to the carrier along spaced, parallel, slide axes between locked positions and disengaged positions; at least first and second seats adapted to be secured to the frame rails and for receiving the pins in the locked positions; a lever having first and second ends, with the lever being pivotally mounted to the carrier about a pivot axis extending perpendicular to the slide axes of the pins; first and second links each having first and second ends, with the first end of the first link being pivotally connected to the first end of the lever and the first end of the second link being pivotally connected to the second end of the lever, with the second end of the first link being pivotally connected to the first pin and the second end of the second link being pivotally connected to the second pin; and means for pivoting the lever about the pivot axis.

16. The axle assembly of claim 15 wherein the movably mounting means comprises, in combination: first and second, longitudinally extending L-shaped supports each having vertical legs and horizontal legs, with the vertical legs being adapted to be secured to the frame rails with the horizontal legs extending inwardly of the vertical legs and positioned spaced from and parallel to the frame rails, with the carrier having side edges adapted to extend between the horizontal legs of the supports and the frame rails, with the seats being formed on the L-shaped supports.

17. Axle assembly for a vehicle adapted to travel over a surface and having longitudinally extending frame rails, comprising, in combination: a carrier; means for movably mounting the carrier to the frame rails of the vehicle for movement in a longitudinal direction between a retracted position and an extended position; an axle including at least a pair of wheels; means for mounting the axle to the carrier; a screw rotatably mounted about a longitudinal axis; a threaded collar threadably received on the screw for longitudinal movement on the screw with rotation of the screw, with the collar being fixed to the carrier; and means for rotating the screw for moving the carrier in the movably mounting means between the retracted and extended positions.

18. The axle assembly of claim 17 wherein the movably mounting means comprises, in combination: first and second, longitudinally extending L-shaped supports each having vertical legs and horizontal legs, with the vertical legs being adapted to be secured to the frame rails with the horizontal legs extending inwardly of the vertical legs and positioned spaced from and parallel to the frame rails, with the carrier having side edges adapted to extend between the horizontal legs of the supports and the frame rails.

19. The axle assembly of claim 17 wherein the axle mounting means comprises, in combination: at least a first arm having a first end and a second end, with the axle secured to the first end of the arm and the second end of the arm being pivotally mounted to the carrier; and means for pivoting the arm relative to the carrier.

20. Axle assembly for a vehicle adapted to travel over a surface and having longitudinally extending frame rails, comprising, in combination: an axle including at least a pair of wheels; means for mounting the axle to the frame rails for vertical movement of the wheels and for providing a shock absorber effect between the wheels and the frame rails; and means for providing a removable rigid connection between the axle and the frame rails comprising, in combination: at least a first pedestal having lower and upper ends; and means for moving the pedestal between a transport position and a lock-out position, with the pedestal positioned between the axle and the frame rails in the lock-out position for sandwiching between the axle and the frame rails, with the pedestal being in a non-engaging condition with at least one of the axle and the frame rails in the transport position allowing vertical movement of the axle relative to the frame rails.

21. The axle assembly of claim 20 wherein the pedestal moving means comprises, in combination: means for pivoting the pedestal about an axis between the transport position and the lock-out position.

22. The axle assembly of claim 21 wherein the pedestal pivoting means comprises, in combination: means for pivotally mounting the pedestal about the axis; and a retractable and extendable cylinder for pivoting the pedestal about the axis.

23. The axle assembly of claim 22 wherein the pivotally mounting means pivotally mounts the pedestal to the axle.

24. The axle assembly of claim 21 wherein the pivoting means comprises, in combination: a shaft rotatable about the axis; an arcuate bracket secured to the shaft for rotation with the shaft about the axis, with the pedestal secured to the bracket; and means for rotating the shaft about the axis.

25. The axle assembly of claim 20 wherein the axle mounting means comprises, in combination: at least a first arm having a first end and a second end, with the axle secured to the first end of the arm and the second end of the arm adapted to be pivotally mounted relative to the frame rails; and means for pivoting the arm relative to the frame rails.

26. The axle assembly of claim 25 wherein the axle mounting means comprises means for mounting the axle for vertical movement of the wheels between a surface engaging position and an elevated position spaced above the surface.

27. The axle assembly of claim 1 wherein the second end of the pivoting means is located forward of the axle.

28. The axle assembly of claim 27 wherein the first end of the pivoting means is located forward of the lateral axis.

29. The axle assembly of claim 28 wherein the pivoting means comprises an actuator which is hydraulically energized and which includes an accumulator to provide a shock absorber effect between the wheels and the carrier.

30. The axle assembly of claim 1 wherein the first end of the pivoting means is located forward of the lateral axis.

31. The axle assembly of claim 1 wherein the pivoting means comprises an actuator which is hydraulically energized and which includes an accumulator to provide a shock absorber effect between the wheels and the carrier.

32. The axle assembly of claim 31 wherein the first end of the pivoting means is located forward of the lateral axis.

33. The axle assembly of claim 1 wherein the lateral axis is located adjacent the rear of the carrier.

* * * * *